United States Patent
Igura (10) Patent No.: US 8,817,901 B2
(45) Date of Patent: Aug. 26, 2014

(54) CHANNEL ESTIMATE INTERPOLATION CIRCUIT AND METHOD

(75) Inventor: Hiroyuki Igura, Tokyo (JP)

(73) Assignee: NEC Corporation, Tokyo (JP)

( * ) Notice: Subject to any disclaimer, the term of this patent is extended or adjusted under 35 U.S.C. 154(b) by 175 days.

(21) Appl. No.: 13/522,859

(22) PCT Filed: Dec. 7, 2010

(86) PCT No.: PCT/JP2010/007100
§ 371 (c)(1),
(2), (4) Date: Jul. 18, 2012

(87) PCT Pub. No.: WO2011/092783
PCT Pub. Date: Aug. 4, 2011

(65) Prior Publication Data
US 2012/0300865 A1    Nov. 29, 2012

(30) Foreign Application Priority Data
Feb. 1, 2010    (JP) .................................. 2010-020638

(51) Int. Cl.
*H04B 15/00* (2006.01)

(52) U.S. Cl.
USPC .......................................................... 375/260

(58) Field of Classification Search
None
See application file for complete search history.

(56) References Cited

U.S. PATENT DOCUMENTS

| 8,275,057 | B2 * | 9/2012 | Hewavithana et al. | 375/260 |
|---|---|---|---|---|
| 2001/0015954 | A1 * | 8/2001 | Kuwabara et al. | 370/206 |
| 2008/0112386 | A1 * | 5/2008 | Ogawa et al. | 370/345 |
| 2008/0267320 | A1 * | 10/2008 | Dateki | 375/316 |
| 2010/0118993 | A1 * | 5/2010 | Galda et al. | 375/260 |
| 2010/0220797 | A1 | 9/2010 | Namba et al. | |
| 2012/0328055 | A1 * | 12/2012 | Yokote | 375/340 |

FOREIGN PATENT DOCUMENTS

| JP | 2008-167088 A | | 7/2008 | |
|---|---|---|---|---|
| JP | 2008167088 | * | 7/2008 | H04J 11/00 |
| WO | 2007/077608 A1 | | 7/2007 | |
| WO | 2009/028589 A1 | | 3/2009 | |

OTHER PUBLICATIONS

Takashi Dateki, et al., "OFDM Channel Estimation by Adding a Virtual Channel Frequency Response", Proceedings of the IEICE General Conference, The Institute of Electronics, Information and Communication Engineers, Mar. 8, 2006, p. 447.

* cited by examiner

*Primary Examiner* — Chieh M Fan
*Assistant Examiner* — Bahman Badipour
(74) *Attorney, Agent, or Firm* — Sughrue Mion, PLLC (57) ABSTRACT

To more accurately generate a virtual waveform of channel estimate values outside a bandwidth upon their interpolation in OFDM system while preventing the circuit size from increasing, a converter (104) performs a linear interpolation between channel estimate values corresponding to reference signals arranged at both ends of a predetermined bandwidth among first channel estimate values estimated based on reference signals, thereby estimating second channel estimate values corresponding to subcarriers outside the bandwidth. The converter (104) performs an inverse-FFT operation for channel estimate values obtained by merging the first and second channel estimate values to obtain a first delay profile, replaces with zero data components delayed for a predetermined threshold time or more in the first delay profile, performs an FFT operation for a delay profile obtained by the replacement to obtain third channel estimate values, and extracts therefrom channel estimate values corresponding to the subcarriers outside the bandwidth.

6 Claims, 9 Drawing Sheets

CHANNEL ESTIMATE INTERPOLATION CIRCUIT AND METHOD

CROSS REFERENCE TO RELATED APPLICATIONS

This application is a National Stage of International Application No. PCT/JP2010/007100filed Dec. 7, 2010, claiming priority based on Japanese Patent Application No. 2010-020638filed Feb. 1, 2010, the contents of all of which are incorporated herein by reference in their entirety.

TECHNICAL FIELD

The present invention relates to a channel estimate interpolation circuit and method, and particularly to a circuit and method for generating a virtual waveform of channel estimate values outside a bandwidth upon interpolating channel estimate values in an OFDM (Orthogonal Frequency Division Multiplexing) system.

BACKGROUND ART

Typically, a radio baseband LSI (Large Scale Integration) generates channel estimate values based on reference signals, and performs equalization using the channel estimate values to cancel the distortion occurring in a radio transmission channel, thereby reducing transmission errors.

Recently, an OFDM-based radio baseband standard has been extensively used because of its high transmitting efficiency. However, in the OFDM-based radio baseband standard, it is often the case that reference signals used for channel estimation are discretely arranged in frequency domain. In this case, the channel estimate values can be calculated only discretely.

Therefore, in a case of calculating a channel estimate value with respect to a frequency component in which the reference signal is not arranged, an interpolation is generally performed using its adjacent channel estimate values. Representative examples of methods of the interpolation include a linear interpolation. However, in a case of interpolating in the frequency domain, there is a problem that a difference between a channel estimate value obtained by the linear interpolation and an actual channel estimate value becomes larger.

Figure 7:
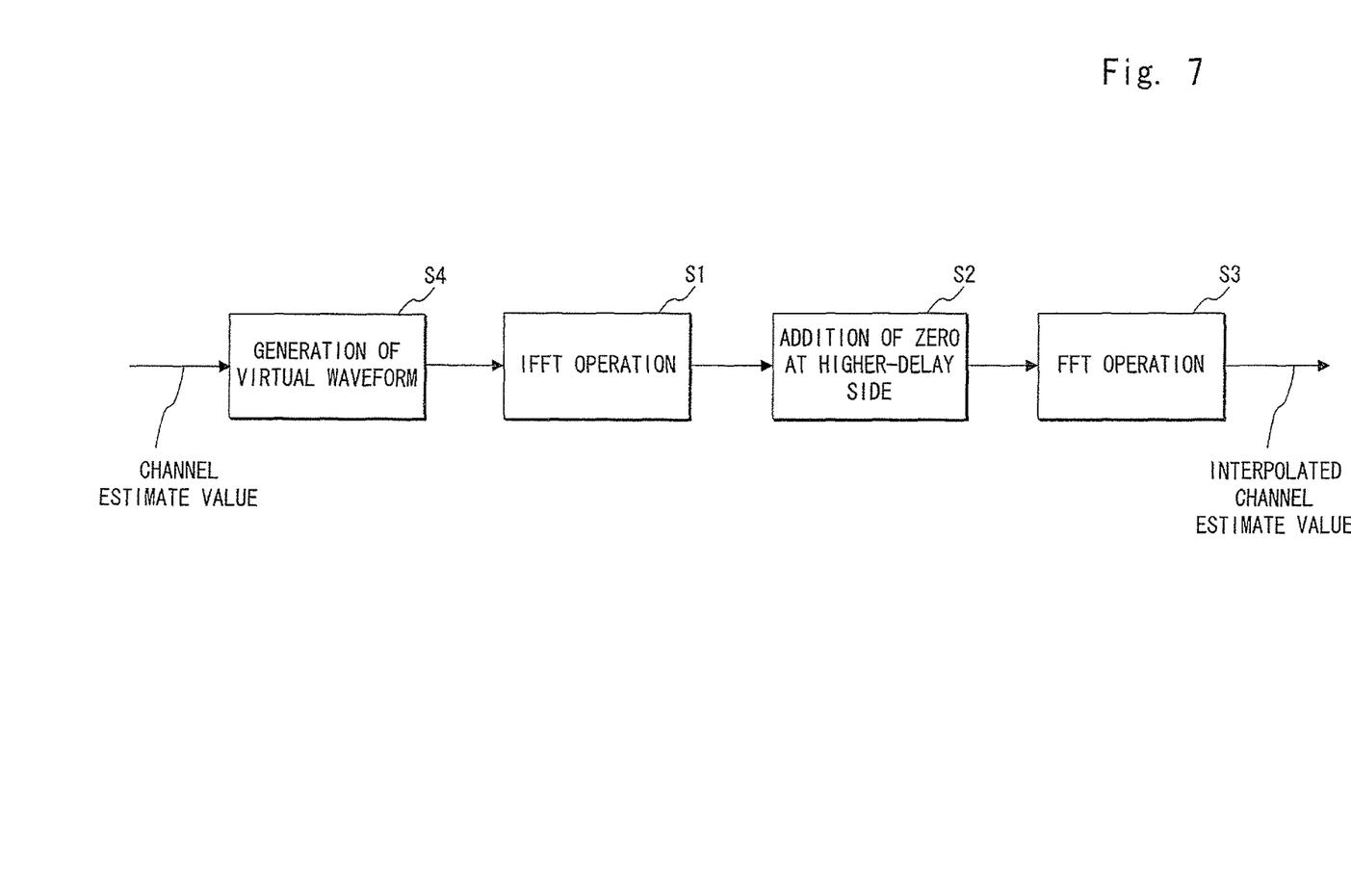
FIG. 7 is a flow chart showing an example of a typical interpolation of channel estimate values.

In order to address such a problem, there is sometimes used a technique referred to as an FFT (Fast Fourier Transform) interpolation. As shown in FIG. 7, in the FFT interpolation, a delay profile is generated by performing an inverse-FFT operation for the discretely calculated channel estimate values (Step S1), zeros are added to the delay profile by numbers equivalent to all of interpolation points (Step S2), and interpolated channel estimate values are calculated by performing an FFT operation for a result of the addition (Step S3).

Meanwhile, in general cases, subcarrier signals used in the OFDM system do not exist over all of bands where the FFT operation is performed. Similarly, the reference signals used for the channel estimation do not exist over all of the bands where the FFT operation is performed, but actually exist only within a certain bandwidth among all of the bands. Therefore, as shown at Step S4 in FIG. 7, it is necessary to generate a virtual waveform of channel estimate values outside the bandwidth by an extrapolation or the like.

Examples of the extrapolation applied upon generation of the virtual waveform include a method using a simple linear interpolation. However, there is a problem that a difference between the virtual waveform and an actual waveform becomes larger.

As examples of techniques to address such a problem, PTL 1 discloses a method of extracting only pass locations from the delay profile generated by the inverse-FFT operation, performing an FFT operation for a result of the extraction, and generating the virtual waveform by adjusting locations of discontinuous points in a result of the FFT operation.

Further, PTL 2 has proposed a method of generating two tangential lines from sub carriers within the bandwidth toward the outside of the bandwidth, and generating the virtual waveform by multiplying the tangential lines by a window function.

CITATION LIST

Patent Literature

PTL 1: Japanese Unexamined Patent Application Publication No. 2008-167088
PTL 2: International Patent Publication No. 2007/077608

SUMMARY OF INVENTION

Technical Problem

As described above, it is necessary to generate the virtual waveform of channel estimate values outside the bandwidth in the case of using the FFT interpolation upon the interpolation of channel estimate values in the OFDM-based radio baseband standard. However, there is a problem in the generation of virtual waveform by the simple linear interpolation that the difference from the actual waveform is large. On the other hand, there is another problem in the above-mentioned PTLs 1 and 2 that it is necessary to arrange circuits which execute very complicated processing such as a circuit extracting the pass locations and a circuit multiplying the window function in addition to circuits used for the typical FFT interpolation to perform the FFT operation and the inverse-FFT operation, so that the circuit size increases.

Accordingly, an exemplary object of the present invention is to more accurately generate a virtual waveform of channel estimate values outside a bandwidth upon interpolating channel estimate values in an OFDM system, while preventing the circuit size from increasing.

Solution to Problem

In order to achieve the above-mentioned object, a channel estimate interpolation circuit according to one exemplary aspect of the present invention includes an arithmetic unit that selectively performs an FFT operation or an inverse-FFT operation; a first buffer that stores first channel estimate values estimated based on reference signals discretely arranged in subcarriers within a predetermined bandwidth; a second buffer that stores a result of the operation obtained by the arithmetic unit; and a converter that is connected to the arithmetic unit, and the first and second buffers. The converter is configured to execute (A) a process to estimate second channel estimate values corresponding to subcarriers outside the bandwidth, by performing a linear interpolation between channel estimate values corresponding to reference signals arranged at both ends of the bandwidth among the first channel estimate values stored in the first buffer; (B) a process to cause the arithmetic unit to perform the inverse-FFT operation for channel estimate values obtained by merging the first and second channel estimate values, and to store a first delay profile obtained by the inverse-FFT operation in the second buffer; (C) a process to replace data components with zero, the data components delayed for a predetermined threshold time or more in the first delay profile stored in the second buffer; (D) a process to cause the arithmetic unit to perform the FFT operation for a delay profile obtained by the replacement, to store third channel estimate values obtained by the FFT operation in the second buffer; and (E) a process to extract channel estimate values corresponding to the subcarriers outside the bandwidth from the third channel estimate values stored in the second buffer.

Further, a channel estimate interpolation method according to another exemplary aspect of the present invention includes (A) performing a linear interpolation between channel estimate values corresponding to reference signals arranged at both ends of a predetermined bandwidth among first channel estimate values to estimate second channel estimate values corresponding to subcarriers outside the bandwidth, the first channel estimate values being preliminarily stored and estimated based on reference signals, the reference signals being discretely arranged in subcarriers within the bandwidth; (B) performing an inverse-FFT operation for channel estimate values obtained by merging the first and second channel estimate values to generate a first delay profile; (C) replacing data components with zero, the data components delayed for a predetermined threshold time or more in the first delay profile; (D) performing an FFT operation for a delay profile obtained by the replacement to generate third channel estimate values; and (E) extracting channel estimate values corresponding to the subcarriers outside the bandwidth from the third channel estimate values.

Advantageous Effects of Invention

According to the present invention, it is possible to more accurately generate a virtual waveform of channel estimate values outside a bandwidth upon interpolating channel estimate values in an OFDM system, while preventing the circuit size from increasing. Specifically, it is possible to decrease a difference between the virtual waveform and an actual waveform compared with the traditional case of using only the linear interpolation. This is because difference components included in the virtual waveform are decreased. Further, it is possible to prevent the circuit size from increasing compared with the above-mentioned PTLs 1 and 2. This is because the scale of circuits required to be added upon generating the virtual waveform is very small.

DESCRIPTION OF EMBODIMENTS

Hereinafter, an exemplary embodiment of a channel estimate interpolation circuit according to the present invention will be described in detail with reference to FIGS. 1 to 3, 4A to 4I, 5 and 6. Note that in the drawings, the identical reference symbols denote identical elements and the redundant explanation thereof will be omitted as appropriate to clarify the explanation.

Figure 1:
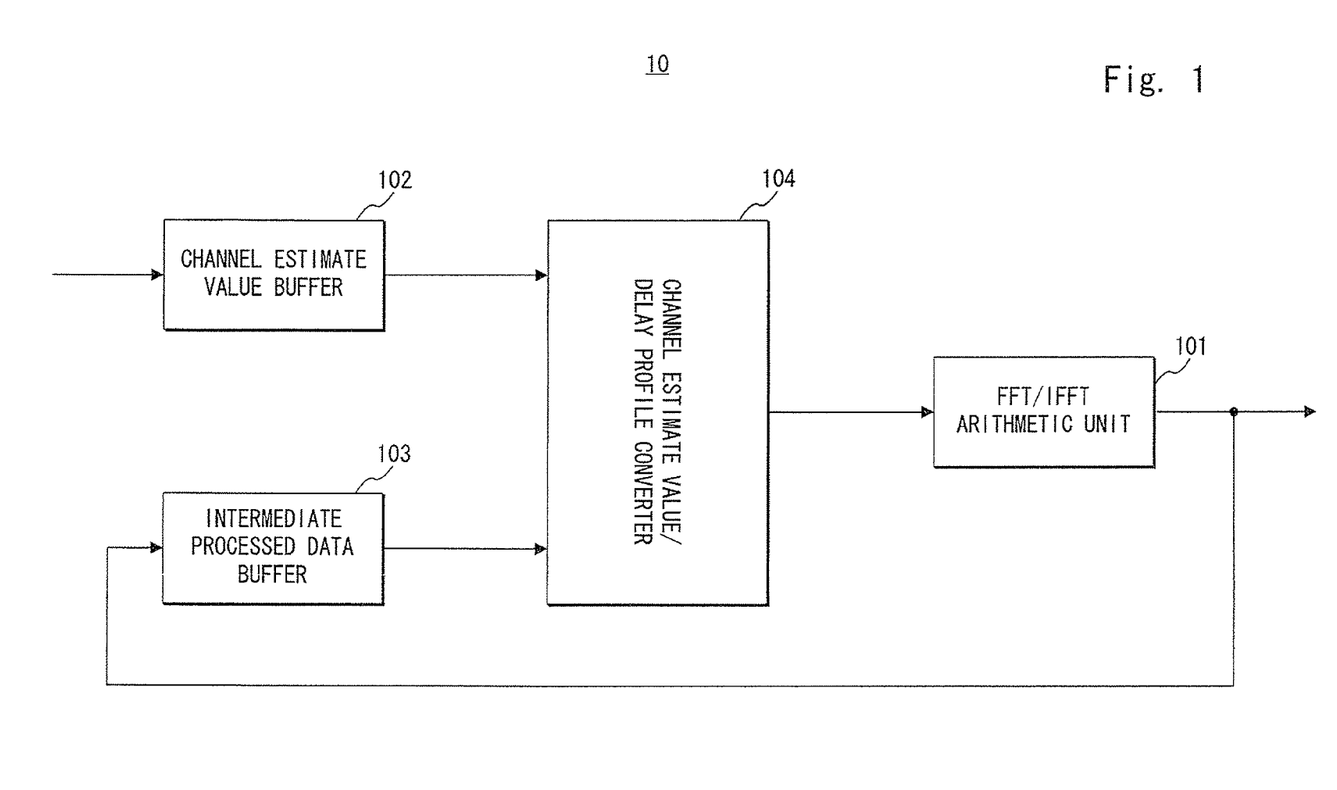
FIG. 1 is a block diagram showing a configuration example of a channel estimate interpolation circuit according to an exemplary embodiment of the present invention.

As shown in FIG. 1, a channel estimate interpolation circuit 10 according to this exemplary embodiment includes an FFT/IFFT arithmetic unit 101, a channel estimate value buffer 102, an intermediate processed data buffer 103, and a channel estimate value/delay profile converter 104.

Among them, the FFT/IFFT arithmetic unit 101 performs an FFT operation or an inverse-FFT operation for data output from the channel estimate value/delay profile converter 104.

Further, the channel estimate value buffer 102 stores channel estimate values input from the antecedent channel estimate circuit (not shown).

Further, the intermediate processed data buffer 103 stores intermediate processed channel estimate values or delay profiles which are obtained as results of the FFT operation or the inverse-FFT operation at the FFT/IFFT arithmetic unit 101.

Furthermore, the channel estimate value/delay profile converter 104 typically executes a process to read out the channel estimate values stored in the channel estimate value buffer 102, and the intermediate processed channel estimate values and delay profiles stored in the intermediate processed data buffer 103. The converter 104 executes a process to process the read channel estimate values and delay profiles. The converter 104 executes a process to control the FFT/IFFT arithmetic unit 101 to interconvert the channel estimate values and the delay profile.

Next, the operation of this exemplary embodiment will be described in detail with reference to FIGS. 2, 3, and 4A to 4I.

Figure 2:
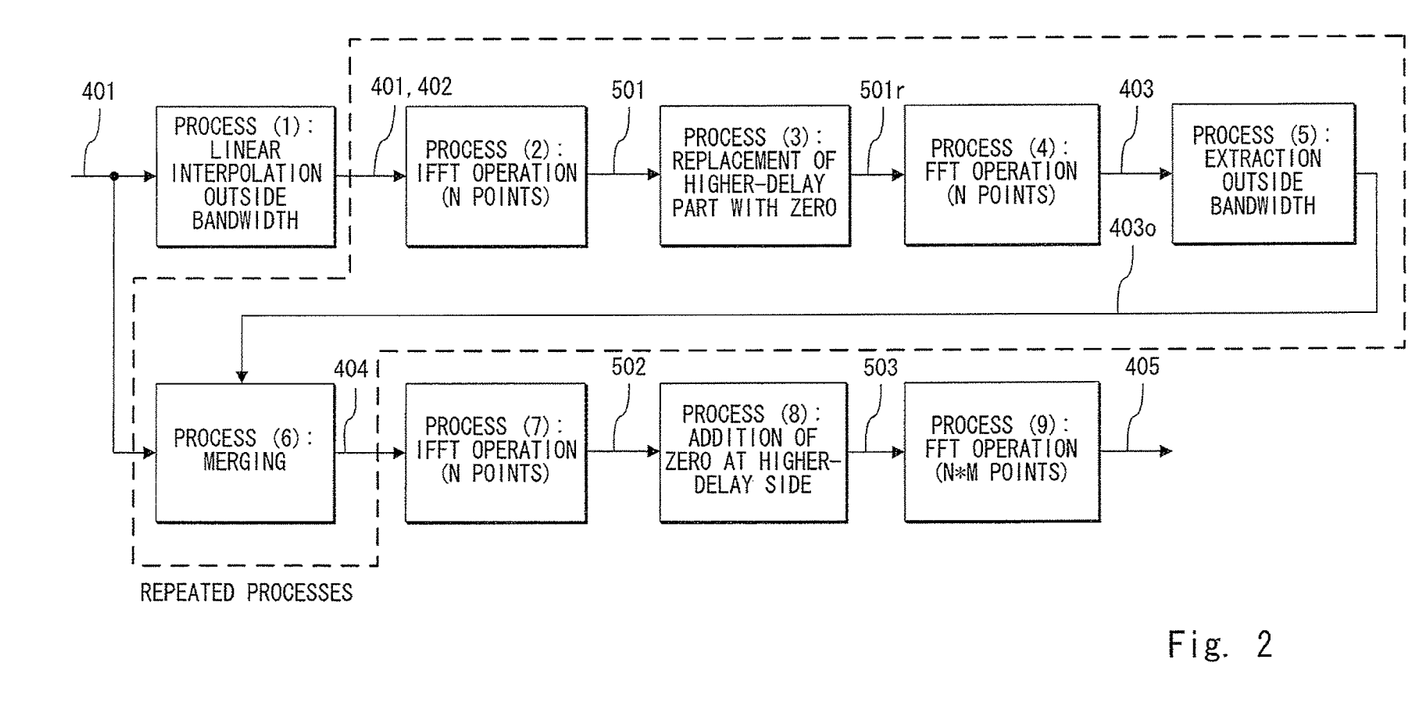
FIG. 2 is a flow chart showing an operation example of the channel estimate interpolation circuit according to the exemplary embodiment of the present invention.

The channel estimate interpolation circuit 10 executes processes (1) to (9) shown in FIG. 2. Hereinafter, these processes (1) to (9) will be subsequently described.

[Process (1)]

Firstly, the channel estimate value buffer 102 stores channel estimate values 401 input from the antecedent channel estimate circuit.

Figure 3:
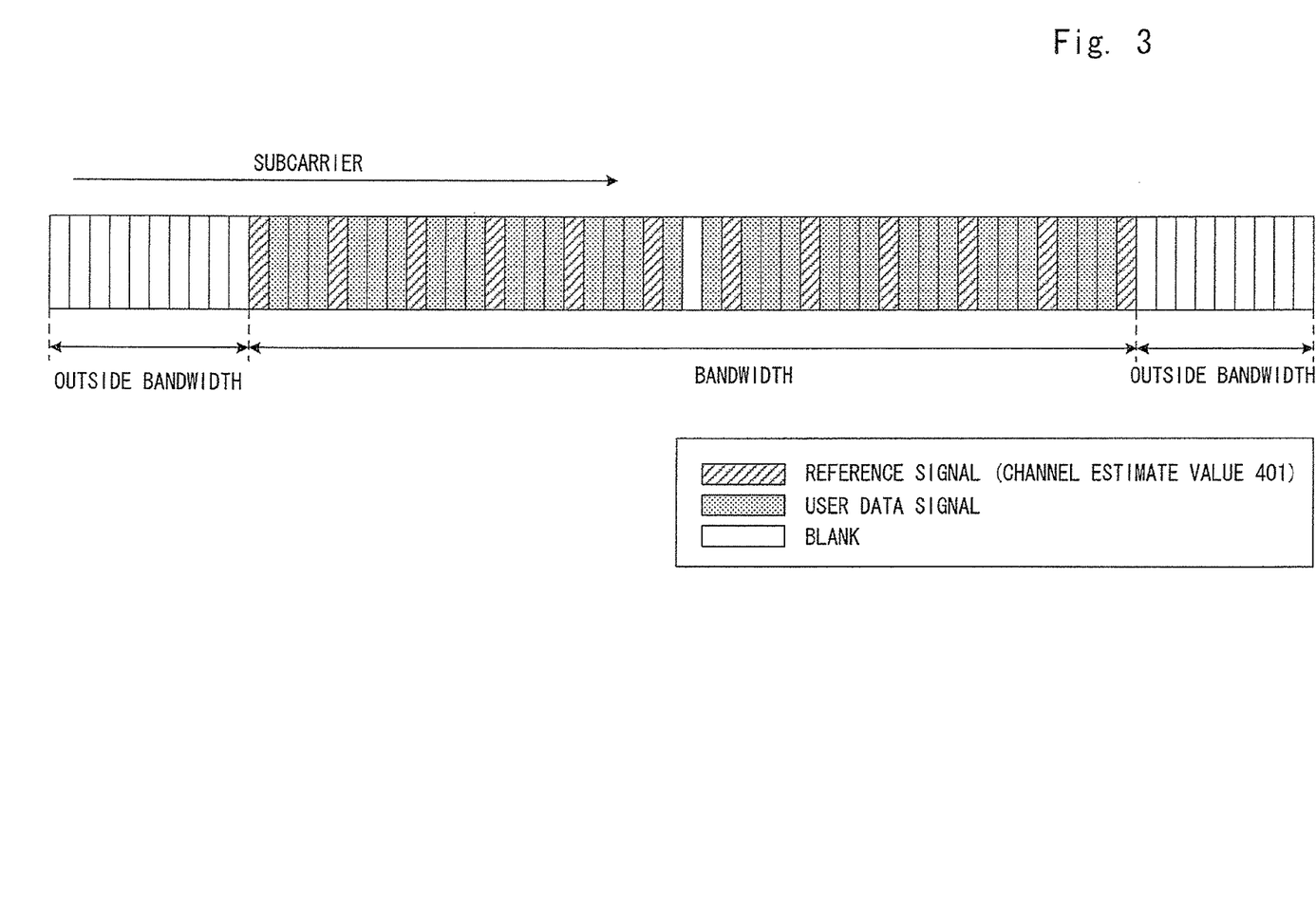
FIG. 3 is a diagram showing a configuration example of subcarrier signals in an OFDM system.

As shown as a configuration example of subcarrier signals in the OFDM system in FIG. 3, the channel estimate values 401 are the ones estimated base on reference signals which are discretely (at certain intervals in the example of FIG. 3) arranged in subcarriers within a predetermined bandwidth. On the other hand, it is not possible to directly calculate channel estimate values corresponding to subcarriers outside the bandwidth among all subcarriers. Upon performing equalization for user data, it is necessary to calculate channel estimate values corresponding to subcarriers in which user data signals are arranged by performing an interpolation for the channel estimate values 401. Further, it is necessary to preliminarily generate a virtual waveform of the channel estimate values corresponding to the subcarriers outside the bandwidth in order to apply the FFT interpolation method as an algorithm of the interpolation. Note that in the subsequent description, it is defined that the interval of subcarriers between the reference signals is M units, and that the total number of sub carriers is "N*M" units. Further, it is defined that the number of reference signals (i.e., the number of channel estimate values 401) is K units. In the example of FIG. 3, it is satisfied that M=4, N=16, and K=12.

Figure 4A:
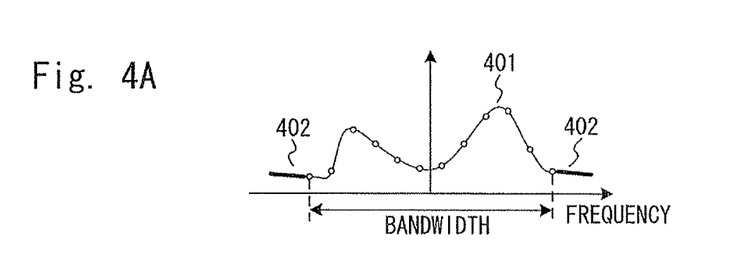
FIG. 4A is a graph showing a first example of channel estimate values generated in the channel estimate interpolation circuit according to the exemplary embodiment of the present invention.

Therefore, the channel estimate value/delay profile converter 104 estimates "N–K" units of channel estimate values 402 which correspond to virtual reference signals existing outside the bandwidth. Specifically, as shown in FIG. 4A, the channel estimate value/delay profile converter 104 performs a linear interpolation between channel estimate values which correspond to reference signals arranged at both of left and right ends of the bandwidth among the channel estimate values 401 read from the channel estimate value buffer 102, thereby connecting the right end of all subcarriers with their left end.

[Process (2)]

Next, the channel estimate value/delay profile converter 104 merges the K units of channel estimate values 401 and the "N–K" units of channel estimate values 402 to input N units of channel estimate values to the FFT/IFFT arithmetic unit 101, thereby causing the FFT/IFFT arithmetic unit 101 to perform the inverse-FFT operation.

Figure 4B:
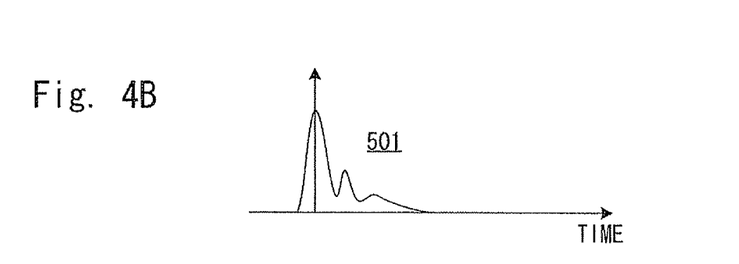
FIG. 4B is a graph showing a first example of delay profiles generated in the channel estimate interpolation circuit according to the exemplary embodiment of the present invention.

As a result, as shown in FIG. 4B, there is obtained a delay profile 501 composed of N units of data components. The delay profile 501 is temporarily stored in the intermediate processed data buffer 103.

[Process (3)]

Figure 4C:
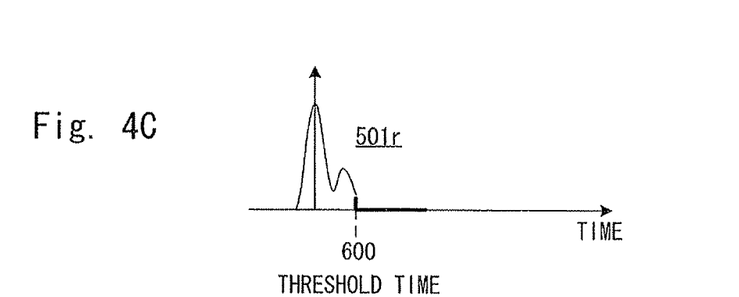
FIG. 4C is a graph showing a second example of delay profiles generated in the channel estimate interpolation circuit according to the exemplary embodiment of the present invention.

Next, the channel estimate value/delay profile converter 104 replaces with "0" data components which are equivalent to a higher-delay part in the delay profile 501 read from the intermediate processed data buffer 103, thereby obtaining a delay profile 501r shown in FIG. 4C. The data components equivalent to the higher-delay part are the ones delayed for a predetermined threshold time 600 or more. Further, the threshold time 600 is preferably set in accordance with characteristics of a delay spread in a radio communication system to which the channel estimate interpolation circuit 10 is applied (i.e., in accordance with the real state of multi-pass propagation).

Thus, it is possible to remove difference components which have occurred in the higher-delay part due to the linear interpolation of outside the bandwidth (in other words, it is possible to decrease difference components included in the virtual waveform of channel estimate values outside the bandwidth).

[Process (4)]

Next, the channel estimate value/delay profile converter 104 inputs the replaced delay profile 501r obtained in the above-mentioned process (3) to the FFT/IFFT arithmetic unit 101, thereby causing the FFT/IFFT arithmetic unit 101 to perform the FFT operation.

Figure 4D:
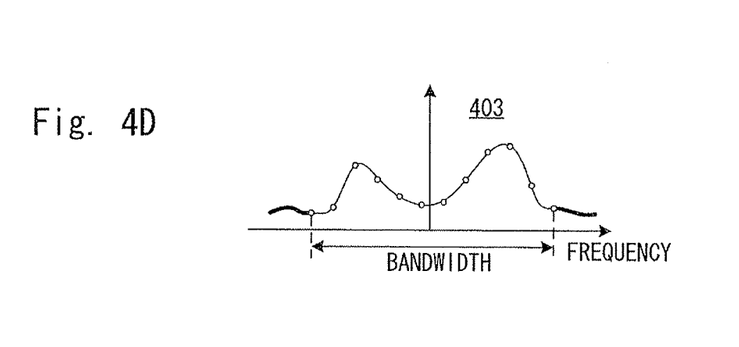
FIG. 4D is a graph showing a second example of channel estimate values generated in the channel estimate interpolation circuit according to the exemplary embodiment of the present invention.

As a result, as shown in FIG. 4D, it is possible to obtain N units of channel estimate values 403 whose difference components outside the bandwidth are decreased. The channel estimate values 403 are temporarily stored in the intermediate processed data buffer 103.

[Process (5)]

Figure 4E:
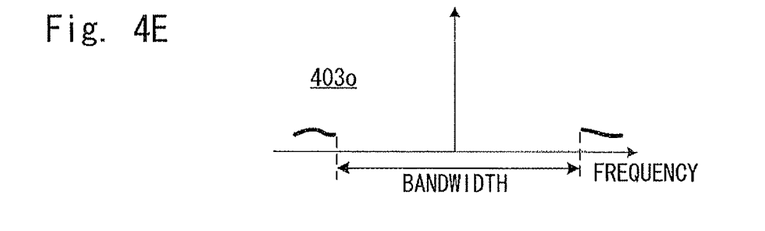
FIG. 4E is a graph showing a third example of channel estimate values generated in the channel estimate interpolation circuit according to the exemplary embodiment of the present invention.

Next, as shown in FIG. 4E, the channel estimate value/delay profile converter 104 extracts "N–K" units of channel estimate values 403o corresponding to the subcarriers outside the bandwidth from the channel estimate values 403 read from the intermediate processed data buffer 103.

Thus, the channel estimate interpolation circuit 10 can accurately generate the virtual waveform of channel estimate values outside the bandwidth with the simple configuration thereof.

[Process (6)]

Figure 4F:
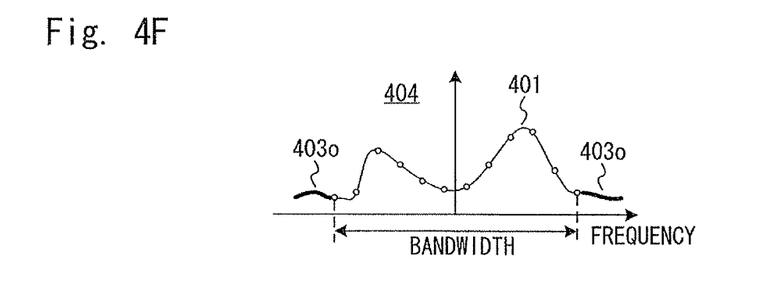
FIG. 4F is a graph showing a fourth example of channel estimate values generated in the channel estimate interpolation circuit according to the exemplary embodiment of the present invention.

Next, as shown in FIG. 4F, the channel estimate value/delay profile converter 104 merges the K units of channel estimate values 401 read from the channel estimate value buffer 102 and the "N–K" units of channel estimate values 403o (the virtual waveform of channel estimate values outside the bandwidth) read from the intermediate processed data buffer 103, thereby obtaining N units of channel estimate values 404.

[Process (7)]

Next, the channel estimate value/delay profile converter 104 inputs the merged channel estimate values 404 obtained in the above-mentioned process (5) to the FFT/IFFT arithmetic unit 101, thereby causing the FFT/IFFT arithmetic unit 101 to perform the inverse-FFT operation.

Figure 4G:
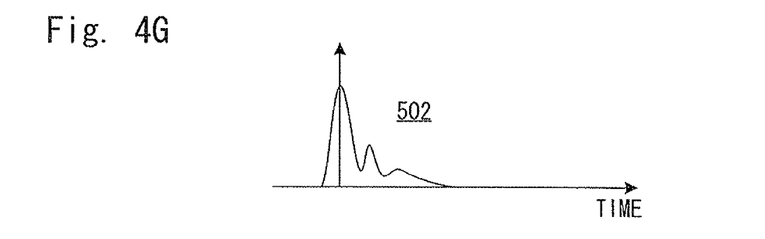
FIG. 4G is a graph showing a third example of delay profiles generated in the channel estimate interpolation circuit according to the exemplary embodiment of the present invention.

As a result, as shown in FIG. 4G, it is possible to obtain a delay profile 502 composed of N units of data components. The delay profile 502 is temporarily stored in the intermediate processed data buffer 103.

[Process (8)]

Figure 4H:
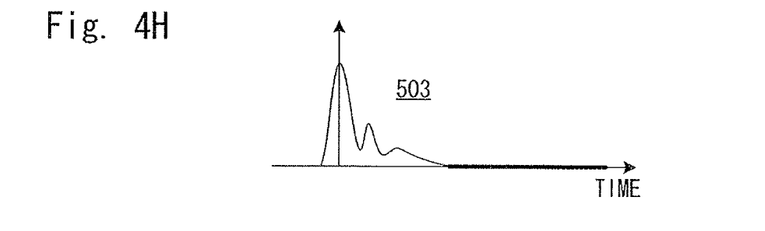
FIG. 4H is a graph showing a fourth example of delay profiles generated in the channel estimate interpolation circuit according to the exemplary embodiment of the present invention.

Next, as shown in FIG. 4H, the channel estimate value/delay profile converter 104 adds "N*M–N" units of "0" to the end (higher-delay part) of the delay profile 502 read from the intermediate processed data buffer 103, thereby obtaining an "N*M"-tuple delay profile 503.

[Process (9)]

Next, the channel estimate value/delay profile converter 104 inputs the delay profile 503 obtained in the above-mentioned process (8) to the FFT/IFFT arithmetic unit 101, thereby causing the FFT/IFFT arithmetic unit 101 to perform the FFT operation.

Figure 4I:
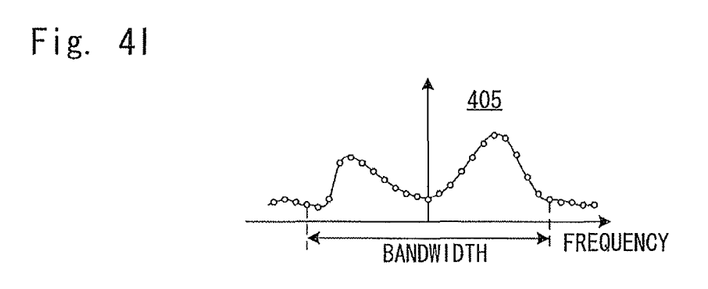
FIG. 4I is a graph showing a fifth example of channel estimate values generated in the channel estimate interpolation circuit according to the exemplary embodiment of the present invention.

As a result, as shown in FIG. 4I, it is possible to obtain "N*M" units of channel estimate values 405. The channel estimate values 405 are values calculated with respect to points obtained by dividing subcarrier locations corresponding to the original channel estimate values 401 and 402 into M parts (i.e., with respect to all subcarriers), and thus the ones where the input channel estimate values 401 are interpolated. Further, the channel estimate values 405 will be provided to the subsequent equalizer (not shown).

Thus, the channel estimate interpolation circuit 10 can also perform the FFT interpolation without modifying any configuration.

Further, the above-mentioned processes (2) to (6) are repeated as shown as dotted lines in FIG. 2, so that it is possible to further decrease the difference components included in the virtual waveform of channel estimate values outside the bandwidth. This is because difference components which have hidden at a lower-delay part in the delay profile are pushed out to the higher-delay part, and the difference components pushed out to the higher-delay part are removed.

Hereinafter, there will be described with reference to FIGS. 5 and 6 a specific configuration example of the channel estimate value/delay profile converter 104 materializing the above-mentioned operation.

Figure 5:
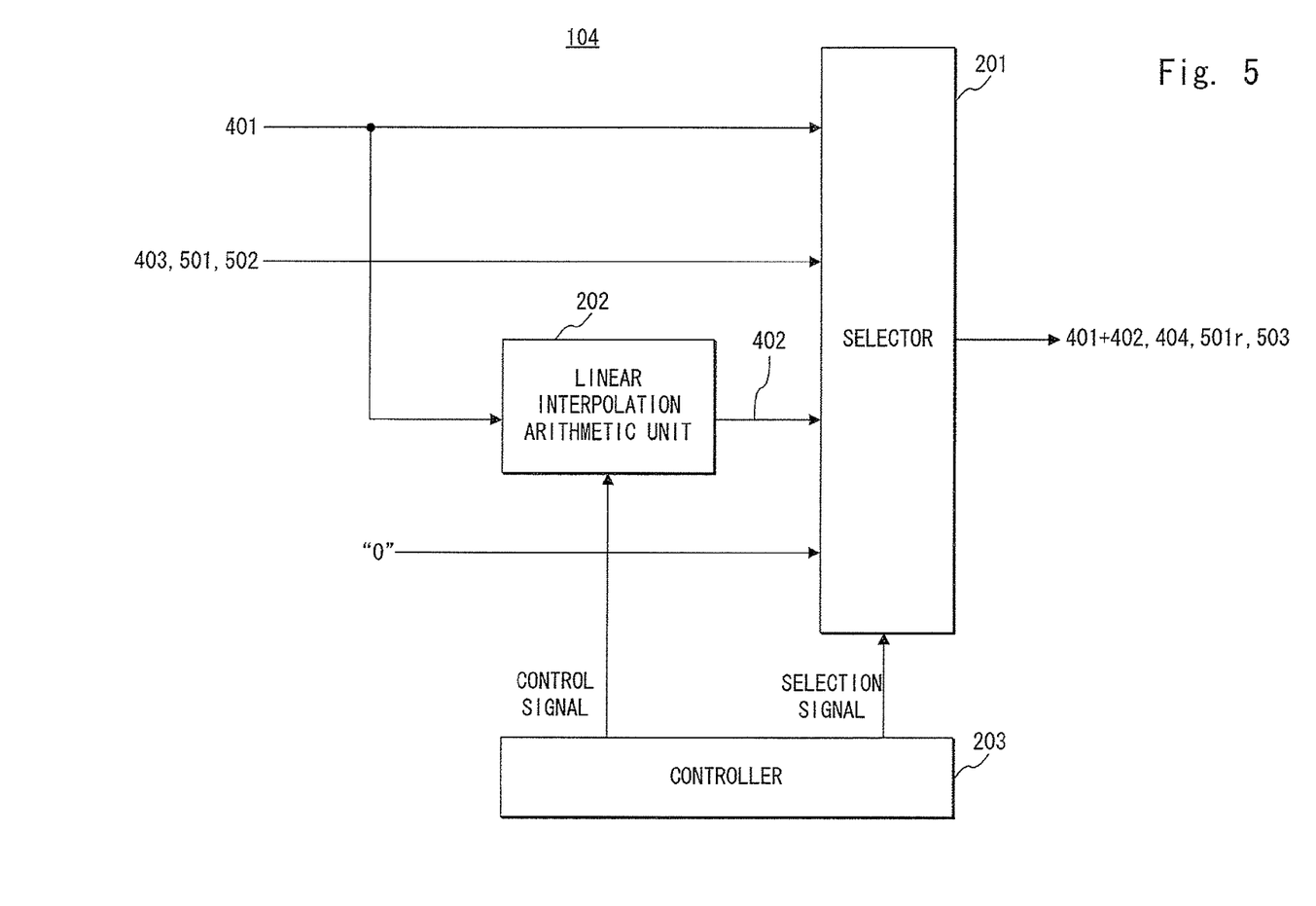
FIG. 5 is a block diagram showing a configuration example of a channel estimate value/delay profile converter used for the channel estimate interpolation circuit according to the exemplary embodiment of the present invention.

As shown in FIG. 5, the channel estimate value/delay profile converter 104 includes a selector 201, a linear interpolation arithmetic unit 202, and a controller 203. The controller 203 controls the selector 201 and the linear interpolation arithmetic unit 202.

Among them, the selector 201 dynamically selects, in accordance with a selection signal from the controller 203, channel estimate values (401) transferred from the channel estimate value buffer 102, intermediate processed data (any one of the channel estimate values 403, and the delay profiles 501 and 502) transferred from the intermediate processed data buffer 103, output data (the channel estimate values 402) from the linear interpolation arithmetic unit 202, or "0", thereby generating converted data (any one of the channel estimate values where the channel estimate values 401 and 402 are merged, the channel estimate values 404 where the channel estimate values 401 and 403o are merged, and the delay profiles 501r and 503).

On the other hand, the linear interpolation arithmetic unit 202 typically performs a liner interpolation for the channel estimate values 401 in accordance with a control signal from the controller 203, thereby estimating the channel estimate values 402 corresponding to the subcarriers outside the bandwidth.

Figure 6:
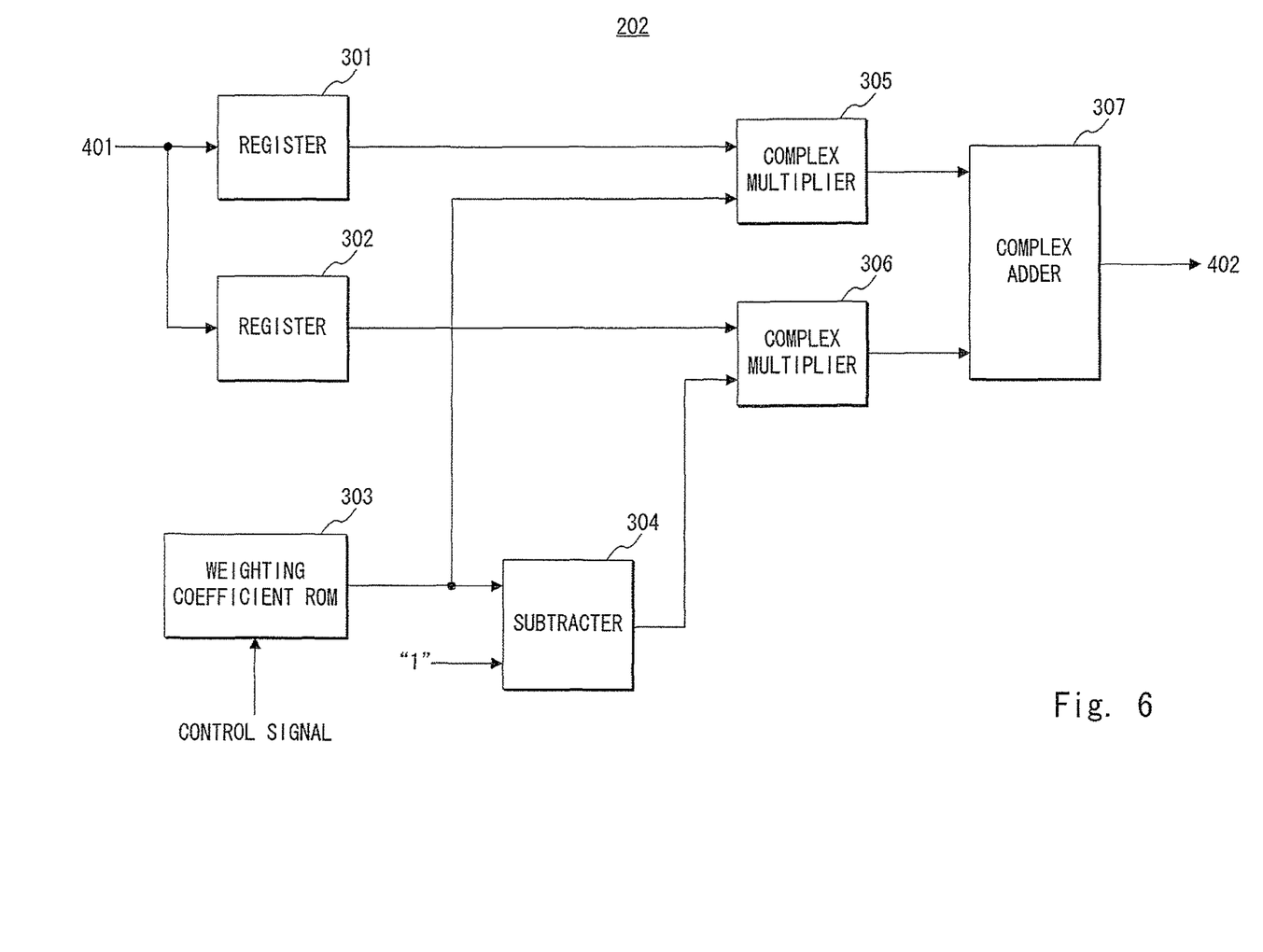
FIG. 6 is a block diagram showing a configuration example of a linear interpolation arithmetic unit used for the channel estimate interpolation circuit according to the exemplary embodiment of the present invention.

Specifically, as shown in FIG. 6, the linear interpolation arithmetic unit 202 includes registers 301 and 302, a weighting coefficient ROM (Read Only Memory) 303, a subtracter 304, complex multipliers 305 and 306, and a complex adder 307. Among them, the register 301 stores a channel estimate value corresponding to a reference signal arranged at one end of the bandwidth among the channel estimate values 401. On the other hand, the register 302 stores a channel estimate value corresponding to a reference signal arranged at another end of the bandwidth. Further, the weighting coefficient ROM 303 stores a plurality of weighting coefficients, and thus one of the weighting coefficients is output in accordance with the control signal. Further, the subtracter 304 subtracts from "1" the weighting coefficient output from the weighting coefficient ROM 303. For example, if the value of weighting coefficient is "0.2", the output value from the subtracter 304 becomes "0.8". Further, the complex multiplier 305 performs a complex multiplication on the channel estimate value stored in the register 301 and the weighting coefficient. On the other hand, the complex multiplier 306 performs a complex multiplication on the channel estimate value stored in the register 302 and the output value (1-weighting coefficient) from the subtracter 304. Furthermore, the complex adder 307 adds a result of the operation by the complex multiplier 305 and a result of the operation by the complex multiplier 306, thereby outputting the channel estimate values 402 where the linear interpolation is performed. Thus, "N–K" units of results of the linear interpolation are output by using the control signal to change the weighting coefficient.

In the operation, in the above-mentioned processes (1) and (2), the K units of channel estimate values 401 within the bandwidth are output as the converted data through the selector 201 as they are, thereby being provided to the FFT/IFFT arithmetic unit 101. Further, the linear interpolation arithmetic unit 202 provides the "N–K" units of channel estimate values 402 outside the bandwidth obtained by the linear interpolation to the FFT/IFFT arithmetic unit 101 through the selector 201.

Next, in the above-mentioned processes (3) and (4), the delay profile 501 stored in the intermediate processed buffer 103 is input as the intermediate processed data. The data components equivalent to the lower-delay part in the delay profile 501 are output through the selector 201 as they are. On the other hand, when the data components equivalent to the higher-delay part are input (taking as an example a case where data components of the delay profile 501 are input in chronological order of corresponding time, if the threshold time 600 shown in FIG. 4 has elapsed since the input of the delay profile 501 was started), the controller 203 generates the selection signal, thereby causing the selector 201 to output "0". Thus, the delay profile 501r in which the data components equivalent to the higher-delay part are replaced with "0" is provided to the FFT/IFFT arithmetic unit 101.

Next, in the above-mentioned processes (5) to (7), the channel estimate values 403 stored in the intermediate processed buffer 103, and the channel estimate values 401 stored in the channel estimate value buffer 102 are input in parallel. The controller 203 generates the selection signal, thereby switching between a state where the selector 201 selects the channel estimate values 403 and a state where the selector 201 selects the channel estimate values 401. Thus, the N units of channel estimate values 404, in which the "N–K" units of channel estimate values 403o outside the bandwidth and the K units of channel estimate values 401 within the bandwidth are merged, are provided to the FFT/IFFT arithmetic unit 101.

Finally, in the above-mentioned processes (8) and (9), the delay profile 502 stored in the intermediate processed buffer 104 is input as the intermediate processed data, and then output through the selector 201 as it is. In addition, the controller 203 generates the selection signal, thereby causing the selector 201 to output "N*M–N" units of "0". Thus, the delay profile 503 in which "0" is added on the higher-delay side is provided to the FFT/IFFT arithmetic unit 101.

Note that the present invention is not limited to the above-mentioned exemplary embodiment, and it will be understood by those of ordinary skill in the art that various changes in form and details may be made therein without departing from the spirit and scope of the present invention as defined by the claims.

This application is based upon and claims the benefit of priority from Japanese patent application No. 2010-020638, filed on Feb. 1, 2010, the disclosure of which is incorporated herein in its entirety by reference.

INDUSTRIAL APPLICABILITY

The present invention is applied to an interpolation of channel estimate values, and is particularly applied to the purpose of generating a virtual waveform of channel estimate values outside a bandwidth upon interpolating channel estimate values in an OFDM system. Examples to which the

REFERENCE SIGNS LIST

10 CHANNEL ESTIMATE INTERPOLATION CIRCUIT
101 FFT/IFFT ARITHMETIC UNIT
102 CHANNEL ESTIMATE VALUE BUFFER
103 INTERMEDIATE PROCESSED DATA BUFFER
104 CHANNEL ESTIMATE VALUE/DELAY PROFILE CONVERTER
201 SELECTOR
202 LINEAR INTERPOLATION ARITHMETIC UNIT
203 CONTROLLER
301, 302 REGISTER
303 WEIGHTING COEFFICIENT ROM
304 SUBTRACTER
305, 306 COMPLEX MULTIPLIER
307 COMPLEX ADDER
401, 402, 403, 403o, 404, 405 CHANNEL ESTIMATE VALUE
501, 501r, 502, 503 DELAY PROFILE

The invention claimed is:

1. A channel estimate interpolation circuit comprising:
an arithmetic unit that selectively performs an FFT (Fast Fourier Transform) operation or an inverse-FFT operation;
a first buffer that stores first channel estimate values estimated based on reference signals discretely arranged in subcarriers within a predetermined bandwidth;
a second buffer that stores a result of the operation obtained by the arithmetic unit; and
a converter that is connected to the arithmetic unit, and the first and second buffers,
wherein the converter is configured to execute:
(A) a process to estimate second channel estimate values corresponding to subcarriers outside the bandwidth, by performing a linear interpolation between channel estimate values corresponding to reference signals arranged at both ends of the bandwidth among the first channel estimate values stored in the first buffer;
(B) a process to cause the arithmetic unit to perform the inverse-FFT operation for channel estimate values obtained by merging the first and second channel estimate values, and to store a first delay profile obtained by the inverse-FFT operation in the second buffer;
(C) a process to replace data components with zero, the data components delayed for a predetermined threshold time or more in the first delay profile stored in the second buffer;
(D) a process to cause the arithmetic unit to perform the FFT operation for a delay profile obtained by the replacement, to store third channel estimate values obtained by the FFT operation in the second buffer; and
(E) a process to extract channel estimate values corresponding to the subcarriers outside the bandwidth from the third channel estimate values stored in the second buffer,
wherein the converter is configured to repeatedly execute the processes (B) to (E) while treating the extracted channel estimate values as the second channel estimate values.

2. The channel estimate interpolation circuit according to claim 1, wherein the converter is configured to further execute:

(F) a process to merge the first channel estimate values stored in the first buffer and the extracted channel estimate values;
(G) a process to cause the arithmetic unit to perform the inverse-FFT operation for fourth channel estimate values obtained by the merging, and to store a second delay profile obtained by the inverse-FFT operation in the second buffer;
(H) a process to generate a third delay profile by adding zero to the end of the second delay profile stored in the second buffer, the number of zeros to be added being obtained by subtracting the number of the fourth channel estimate values from the total number of subcarriers; and
(I) a process to cause the arithmetic unit to perform the FFT operation for the third delay profile.

3. The channel estimate interpolation circuit according to claim 1, wherein the threshold time is set in accordance with characteristics of a delay spread in a radio communication system to which the circuit itself is applied.

4. A channel estimate interpolation method comprising:
(A) performing a linear interpolation between channel estimate values corresponding to reference signals arranged at both ends of a predetermined bandwidth among first channel estimate values to estimate second channel estimate values corresponding to subcarriers outside the bandwidth, the first channel estimate values being preliminarily stored and estimated based on reference signals, the reference signals being discretely arranged in subcarriers within the bandwidth;
(B) performing an inverse-FFT operation for channel estimate values obtained by merging the first and second channel estimate values to generate a first delay profile;
(C) replacing data components with zero, the data components delayed for a predetermined threshold time or more in the first delay profile;
(D) performing an FFT operation for a delay profile obtained by the replacement to generate third channel estimate values; and
(E) extracting channel estimate values corresponding to the subcarriers outside the bandwidth from the third channel estimate values,
wherein the method includes repeatedly performing (B) to (E) while treating the extracted channel estimate values as the second channel estimate values.

5. The channel estimate interpolation method according to claim 4, further comprising:
(F) merging the first channel estimate values and the extracted channel estimate values to generate fourth channel estimate values;
(G) performing an inverse-FFT operation for the fourth channel estimate values to generate a second delay profile;
(H) generating a third delay profile by adding zero to the end of the second delay profile, the number of zeros to be added being obtained by subtracting the number of the fourth channel estimate values from the total number of subcarriers; and
(I) performing an FFT operation for the third delay profile.

6. The channel estimate interpolation method according to claim 4, including setting the threshold time in accordance with characteristics of a delay spread in a radio communication system.

* * * * *

UNITED STATES PATENT AND TRADEMARK OFFICE
CERTIFICATE OF CORRECTION

PATENT NO. : 8,817,901 B2  
APPLICATION NO. : 13/522859  
DATED : August 26, 2014  
INVENTOR(S) : Igura Page 1 of 1

It is certified that error appears in the above-identified patent and that said Letters Patent is hereby corrected as shown below:

In the Specification

Column 5, Line 5: Delete "41." and insert -- 4I. --

Signed and Sealed this  
Third Day of February, 2015

Michelle K. Lee  
*Deputy Director of the United States Patent and Trademark Office*